Nov. 11, 1947.　　　A. E. HARGETT　　　2,430,676
FLAT METER MOUNTING
Filed Jan. 27, 1945

INVENTOR.
ALBERT E. HARGETT,
BY
Hood & Hahn
ATTORNEYS.

Patented Nov. 11, 1947

2,430,676

UNITED STATES PATENT OFFICE 2,430,676

FLAT METER MOUNTING

Albert E. Hargett, Bowling Green, Ky., assignor to Ford Meter Box Company, Wabash, Ind., a corporation of Indiana Application January 27, 1945, Serial No. 574,876

3 Claims. (Cl. 285—3)

The present invention relates to a flat meter mounting, and the primary object of the invention is to provide a mounting for a water meter, or the like, of such character that the spuds of the meter will be coaxial with the service line.

It has been standard practice, in the past, to construct setter units for mounting water meters, and the like, in such a fashion that the meter is raised above the level of the service line. See, for instance, the patent to Edwin H. Ford No. 1,191,503 issued July 18, 1916 and the patent to John L. Ford No. 1,988,003 issued January 15, 1935.

In certain sections of the country, however, it is desirable to reduce to a minimum the elevation of the meter, and various attempts have been made to design structures toward that end.

I have designed a meter setter, self-contained in all respects, which is so constructed that the meter, when mounted upon the setter, is disposed with its spuds in axial alignment with the separated ends of the service pipe, thereby reducing the elevation of the meter to absolute zero.

To the accomplishment of the above and related objects, my invention may be embodied in the form illustrated in the accompanying drawings, attention being called to the fact, however, that the drawings are illustrative only, and that change may be made in the specific construction described, so long as the scope of the appended claims is not violated.

Figure 1:
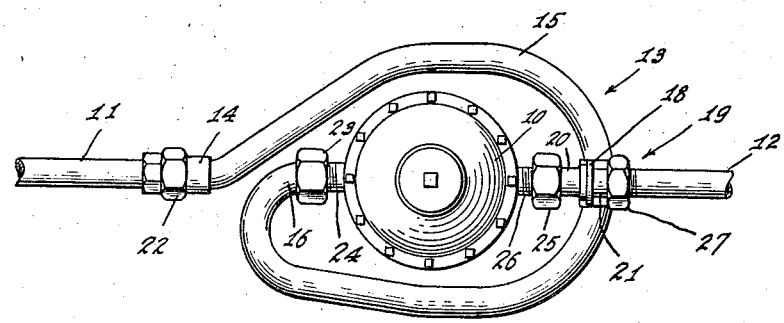
Fig. 1 is a plan view of my meter mounting.
Figure 2:
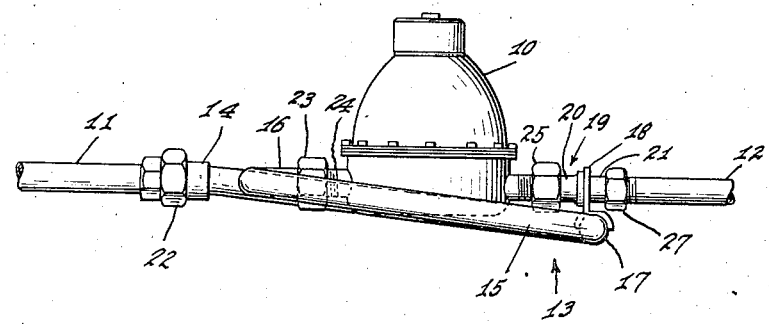
Fig. 2 is a side elevation thereof.

In the accompanying drawings, the reference numeral 10 designates a water meter of standard construction. I have represented the separated ends of a service line, designating them by the reference numerals 11 and 12; and I have shown my meter mounting, indicated generally by the reference numeral 13, connected in the service line and mounting the meter.

My meter mounting comprises a conduit, which in the illustrated embodiment is a single section of flexible tubing as, for instance, copper tubing. One end 14 of the conduit is designed to lie with its axis in a horizontal plane. As is clearly illustrated in the drawings, the main body 15 of the conduit is formed substantially into a loop, said loop being disposed in a plane inclined downwardly from the horizontal plane containing the axis of the conduit end 14. The loop is so constructed that the opposite end 16 of the conduit lies, in coaxial alignment with the conduit end 14, between said conduit end and the major portion of the body 15, and facing oppositely with respect to the conduit end 14. It will be noted that the two ends, 14 and 16, of the conduit lie on the same side of the center of the loop and substantially in a radial plane of said loop, the conduit end 14 facing away from the loop center. That portion 17 of the loop diametrically opposed to the conduit ends 14 and 16 is disposed materially below the horizontal plane containing the common axis of said conduit ends; and at that point, the body of the loop supports a bracket 18 upon which is carried a double ended coupling indicated generally by the reference numeral 19. As is clearly to be seen from a consideration of the drawings, the double ended coupling 19 is disposed in coaxial relation with the conduit ends 14 and 16, and the end 20 of said coupling 19 is spaced from, but faces, the end 16 of the conduit. The opposite end 21 of the coupling 19 faces away from the conduit end 16, and outwardly from the loop.

The conduit end 14 is provided with coupling means 22 whereby it may be connected to the service line 11, and the conduit end 16 is provided with coupling means 23 whereby it may be connected to one spud 24 of the meter 10. A coupling nut 25 carried on the end 20 of the coupling 19 is adapted to connect said coupling end with the opposite spud 26 of the meter; and a coupling nut 27 associated with the end 21 of the coupling 19 provides means for connecting said coupling to the service line 12.

It will be seen that I have thus, in a very simple manner, provided inexpensive means for setting a meter into a service line with the spuds of the meter located in coaxial alignment with the separated ends of the service line.

I claim as my invention:

1. A meter mounting comprising a metal conduit formed to provide an open end, a second open end aligned with said first-named open end and facing in the opposite direction, and a body portion joining said open ends and lying primarily in a plane inclined to the common line of said open ends, and a double-ended coupling supported upon said body portion, aligned with said conduit ends, and facing one of said conduit ends in spaced relation thereto, one of said conduit ends and one end of said coupling being adapted for respective connection to the spuds of a meter.

2. A meter mounting comprising a conduit formed substantially as a loop with the opposite ends located substantially in a common radial plane of said loop and in oppositely-facing alignment, one of said ends opening away from the center of said loop and the other of said ends opening toward the center of said loop, a portion of said loop diametrically opposed to said last-named end being offset from the common line of said ends, and a double-ended coupling supported on said last-named portion of said loop and disposed in alignment with said conduit ends.

3. A meter mounting comprising a conduit formed to provide an open end, a body portion curved into a loop lying in a plane inclined, in the direction of the axis of said end, out of the horizontal plane containing said axis, and a second open end facing oppositely with respect to said first-named end, said conduit ends being coaxially arranged, and said second conduit end being located between said first-named conduit end and the major portion of said body portion, and a double-ended coupling supported on said body portion in axial alignment with said conduit ends and in spaced facing relation to said last-named conduit end.

ALBERT E. HARGETT.

REFERENCES CITED

The following references are of record in the file of this patent:

UNITED STATES PATENTS

| Number | Name | Date |
|---|---|---|
| 1,345,124 | Calhoun | June 29, 1920 |